US012236756B2

(12) United States Patent
Chan et al.

(10) Patent No.: US 12,236,756 B2
(45) Date of Patent: *Feb. 25, 2025

(54) ELECTRONIC METHOD OF GAMING

(71) Applicant: Aristocrat Technologies Australia Pty Limited, North Ryde (AU)

(72) Inventors: Matthew Chan, Gordon (AU); Emily Therese Margaret Ross, Las Vegas, NV (US); Hanna Lee Sanborn, Pflugerville, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 20 days.

This patent is subject to a terminal disclaimer.

(21) Appl. No.: 18/315,988

(22) Filed: May 11, 2023

(65) Prior Publication Data

US 2023/0282073 A1 Sep. 7, 2023

Related U.S. Application Data

(63) Continuation of application No. 17/228,315, filed on Apr. 12, 2021, now Pat. No. 11,670,135, which is a continuation of application No. 16/226,296, filed on Dec. 19, 2018, now Pat. No. 10,977,901.

(30) Foreign Application Priority Data

Dec. 19, 2017 (AU) ................................ 2017279617

(51) Int. Cl.
*G07F 17/32* (2006.01)

(52) U.S. Cl.
CPC ...... *G07F 17/3267* (2013.01); *G07F 17/3209* (2013.01); *G07F 17/3213* (2013.01)

(58) Field of Classification Search
None
See application file for complete search history.

(56) References Cited

U.S. PATENT DOCUMENTS

2003/0022712 A1 1/2003 Locke
2004/0048646 A1 3/2004 Visocnik
2004/0092300 A1 5/2004 Gauselmann
(Continued)

OTHER PUBLICATIONS

Australian Examination Report No. 1 for App. No. AU2017279617, dated Nov. 3, 2023, 5 pages.
(Continued)

*Primary Examiner* — Seng H Lim
(74) *Attorney, Agent, or Firm* — Greenberg Traurig, LLP

(57) ABSTRACT

A gaming machine comprising a display, and a game controller that at least: selects a first set of symbols, causes the display to display the first set of symbols at a first set of display positions and conducts a random selection process so that a second set of display positions has an overlapping spatial relationship with a first set of display positions. The random selection process includes a first type of outcome where a designated number of special symbols is selected and a second type of outcome where less than the designated number of special symbols is selected. Upon the occurrence of the second type of outcome, the game controller displays the less than the designated number of special symbols selected at either individual ones of the first set of display positions or of the second set of display positions, and triggers a feature game for conducting feature game play.

20 Claims, 10 Drawing Sheets

(56) References Cited

U.S. PATENT DOCUMENTS

| | | | |
|---|---|---|---|
| 2005/0037836 | A1 | 2/2005 | Gilmore |
| 2006/0052151 | A1 | 3/2006 | Gomez |
| 2006/0084498 | A1 | 4/2006 | Baerlocher |
| 2006/0205476 | A1 | 9/2006 | Jubinville |
| 2009/0305769 | A1 | 12/2009 | Plowman |
| 2013/0079106 | A1 | 3/2013 | Gauselmann |
| 2013/0344939 | A1 | 12/2013 | Aoki |
| 2014/0141860 | A1 | 5/2014 | Meyer |
| 2015/0094132 | A1 | 4/2015 | Elias |
| 2015/0356813 | A1 | 12/2015 | Mead |
| 2016/0042597 | A1 | 2/2016 | Olive |
| 2016/0049041 | A1 | 2/2016 | Berman |
| 2016/0253873 | A1 | 9/2016 | Olive |
| 2017/0124799 | A1 | 5/2017 | Berman |
| 2017/0236383 | A1 | 8/2017 | Nakamura |
| 2018/0130305 | A1 | 5/2018 | Berman |
| 2018/0268655 | A1 | 9/2018 | Olive |
| 2018/0286183 | A1 | 10/2018 | Davis |
| 2019/0019370 | A1 | 1/2019 | Ono |
| 2020/0193778 | A1 | 6/2020 | Chesworth |
| 2021/0264741 | A1 | 8/2021 | Hufnagl-Abraham |

OTHER PUBLICATIONS

Office Action dated Sep. 21, 2020 for U.S. Appl. No. 16/226,296 (pp. 1-11).

Notice of Allowance dated Dec. 16, 2020 for U.S. Appl. No. 16/226,296 (pp. 1-7).

Corrected Notice of Allowability dated Jan. 13, 2021 for U.S. Appl. No. 16/226,296 (pp. 1-2).

Office Action dated Mar. 31, 2020, for U.S. Appl. No. 16/226,296 (pp. 1-10).

Office Action (Non-Final Rejection) dated Jul. 5, 2022 for U.S. Appl. No. 17/228,315 (pp. 1-11).

Office Action (Notice of Allowance and Fees Due (PTOL-85) dated Feb. 1, 2023 for U.S. Appl. No. 17/228,315 (pp. 1-5).

ELECTRONIC METHOD OF GAMING

RELATED APPLICATIONS

The present application claims priority to U.S. patent application Ser. No. 17/228,315, filed on Apr. 12, 2021, which claims priority to U.S. patent application Ser. No. 16/226,296 (now U.S. Pat. No. 10,977,901), filed on Dec. 19, 2018, which claims priority to Australian Patent Application No. 2017279617, filed on Dec. 19, 2017, and entitled "An Electronic Method of Gaming," all of which are hereby incorporated by reference in their entireties.

BACKGROUND

The present disclosure relates to an electronic method of gaming, an electronic gaming system, and a gaming machine. In an embodiment, the disclosure provides an electronic method of gaming where a secondary game is conducted in parallel, such as concurrently, with a primary game using the same display area as the primary game, for example, using a second set of reels that are displayed as being overlaid on the reels of the primary game.

Many players of gaming systems (e.g. slot machines) enjoy playing games they are familiar with, such as well-known or classic games. However, such games, are often limited in terms of their game play.

Accordingly, there is a need for alternative gaming systems.

SUMMARY

In a first aspect of the disclosure, there is provided an electronic method of gaming comprising: selecting a first set of symbols from a first symbol set using a first random process; causing an electronic display to display the first set of symbols at a first set of display positions, the first set of display positions being arranged in a plurality of columns set side by side; evaluating the first set of symbols to determine whether the first set of symbols incorporates one or more winning combinations for which an award should be made; conducting a second random selection process in respect of either the first set of display positions or a second set of display positions displayed so that each display position of the second set of display positions has an overlapping spatial relationship with a corresponding one of the first set of symbol display positions, wherein possible outcomes of the second random selection process include a first type of outcome where at least a designated number of special symbols is selected and a second type outcome where less than the designated number of special symbols is selected; upon the outcome of the second random selection process being the second type of outcome, 1) displaying at least the selected special symbols at either individual ones of the first set of display positions or individual ones of the second set of display positions, and 2) triggering a feature game; and upon the feature game being triggered, conducting the feature game, wherein an outcome of the feature game is determined at least in part based on a number of special symbols displayed at the conclusion of the feature game.

In an embodiment, selecting the first set of symbols comprises selecting symbols from a plurality of reel strips each having a plurality of different symbols of the first symbol set.

In an embodiment, selecting the first set of symbols comprises randomly selecting a stopping position for each of the reel strips.

In an embodiment, each reel strip corresponds to a respective one of the columns of the first set of display positions.

In an embodiment, each reel strip is an individual reel strip that corresponds to an individual display position of the first set of display positions.

In an embodiment, the second random selection process comprises selecting a second set of symbols from a second symbol set.

In an embodiment, selecting the second set of symbols comprises selecting symbols from a plurality of reel strips each having a plurality of different symbols of the first symbol set.

In an embodiment, selecting the second set of symbols comprises randomly selecting a stopping position for each of the reel strips.

In an embodiment, each reel strip corresponds to a respective one of the columns of the first set of display positions.

In an embodiment, each reel strip is an individual reel strip that corresponds to an individual display position of the first set of display positions.

In an embodiment, the second random selection process comprises randomly selecting stopping positions for a second set of reel strips.

In an embodiment, each second reel strip comprises one or more reel strip positions having a special symbol and one or more blank reel strip positions having no symbol.

In an embodiment, each reel strip position of each second reel strip that does not have a special symbol is a blank reel strip position.

In an embodiment, each second reel strip comprises one or more reel strip positions having a special symbol and the other reel strip positions have other symbols.

In an embodiment, each special symbol is a trigger symbol.

In an embodiment, each special symbol is a configurable symbol, and the method comprises configuring at least any displayed configurable symbols, each configurable symbol being configured by having a prize assigned.

In an embodiment, any symbols displayed at the second set of display positions are displayed as being at least partially transparent to enable at least part of the symbol displayed at the corresponding symbol position of the first set of display positions to be seen.

In an embodiment, the overlapping spatial relationship is that the second set of display positions overlay the first set of symbol display positions.

In an embodiment, the overlapping spatial relationship is that the second set of display positions is displayed at different display depth relative to the first set of display positions so as to overlap from one viewing perspective but only partially overlap from another viewing perspective.

In an embodiment, the overlapping spatial relationship is that the first set of display positions overlay the second set of symbol display positions.

In an embodiment, the overlapping spatial relationship is that the first set of display positions is displayed at different display depth relative to the second set of display position so as to overlap from one viewing perspective but only partially overlap from another viewing perspective.

In an embodiment, any selected special symbols replace symbols at respective first display positions for a defined time period.

In an embodiment, the feature game comprises conducting a third random process in respect of the first set of display positions.

In an embodiment, the feature game comprises conducting a third random process in respect of the second set of display positions.

In an embodiment, conducting the feature game comprises conducting a series of free games.

In an embodiment, conducting the series of free games comprises retaining for subsequent display previously displayed special symbols.

In an embodiment, the third random selection process comprises selecting symbols from a second symbol set.

In an embodiment, the method comprises selecting symbols from a plurality of reel strips each having a plurality of different symbols of the first symbol set.

In an embodiment, selecting the second set of symbols comprises randomly selecting a stopping position for each of the reel strips.

In an embodiment, each reel strip corresponds to a respective one of the columns of the first set of display positions.

In an embodiment, each reel strip is an individual reel strip that corresponds to an individual display position of the first set of display positions.

In an embodiment, the third random selection process comprises randomly selecting stopping positions for a second set of reel strips.

In an embodiment, each second reel strip comprises one or more reel strip positions having a special symbol and one or more blank reel strip positions having no symbol.

In an embodiment, each reel strip position of each second reel strip that does not have a special symbol is a blank reel strip position.

In an embodiment, each second reel strip comprises one or more reel strip positions having a special symbol and the other reel strip positions have other symbols.

In an embodiment, the second random process employs a second set of reel strips and the third random process employs a third set of reel strips different to the second set of reels strips In an embodiment, the method comprises increasing a number of free games remaining in response to the selection of one or more special symbols in at least one of the free games.

In an embodiment, the method comprises configuring each configurable symbol prior to it being displayed.

In an embodiment, the method comprises receiving a player selection of a subset of the first set of display positions or the second set of display positions prior to play of the feature game, and wherein the outcome of the feature game is also determined at least in part based on a number of special symbols displayed in the subset of display positions at the conclusion of the feature game.

In an embodiment, the subset is three display positions.

In an embodiment, a multiplier is awarded if special symbols occupy all display positions of the subset of display positions.

In an embodiment, the method comprises conducting the feature game using only the second set of display positions.

In a second aspect of the disclosure, there is provided an electronic gaming system comprising: an electronic display; a memory storing program code; and at least one processor executing the program code to: select a first set of symbols from a first symbol set using a first random process; cause an electronic display to display the first set of symbols at a first set of display positions, the first set of display positions being arranged in a plurality of columns set side by side; evaluate the first set of symbols to determine whether the first set of symbols incorporates one or more winning combinations for which an award should be made; conduct a second random selection process in respect of either the first set of display positions or a second set of display positions displayed so that each display position of the second set of display positions has an overlapping spatial relationship with a corresponding one of the first set of symbol display positions, wherein possible outcomes of the second random selection process include a first type of outcome where at least a designated number of special symbols is selected and a second type outcome where less than the designated number of special symbols is selected; upon the outcome of the second random selection process being the second type of outcome, 1) displaying at least the selected special symbols at either individual ones of the first set of display positions or individual ones of the second set of display positions, and 2) triggering a feature game; and upon the feature game being triggered, conducting the feature game, wherein an outcome of the feature game is determined at least in part based on a number of special symbols displayed at the conclusion of the feature game.

In a third aspect of the disclosure, there is provided a gaming machine comprising: a display; a credit input mechanism operable to establish credits on the gaming machine, the credit input mechanism including at least one of a coin input chute, a bill collector, a card reader and a ticket reader; meters configured for monitoring credits established via the credit input mechanism and changes to the established credits due to play of the gaming machine, the meters including a credit meter to which credit input via the credit input mechanism is added and a win meter; a random number generator; a game play mechanism including a plurality of buttons configured for operation by a player to input a wager from the established credits and to initiate a play of a game; and a game controller comprising a processor and memory storing (i) game program code, and (ii) a plurality of reel strips, the game controller executing the game program code stored in the memory and responsive to initiation of the play of the game with the game play mechanism to: select a first set of symbols from a first symbol set using a first random process; cause the display to display the first set of symbols at a first set of display positions, the first set of display positions being arranged in a plurality of columns set side by side; evaluate the first set of symbols to determine whether the first set of symbols incorporates one or more winning combinations for which an award should be made; conduct a second random selection process in respect of either the first set of display positions or a second set of display positions displayed so that each display position of the second set of display positions has an overlapping spatial relationship with a corresponding one of the first set of symbol display positions, wherein possible outcomes of the second random selection process include a first type of outcome where at least a designated number of special symbols is selected and a second type outcome where less than the designated number of special symbols is selected; upon the outcome of the second random selection process being the second type of outcome, 1) displaying at least the selected special symbols at either individual ones of the first set of display positions or individual ones of the second set of display positions, and 2) triggering a feature game; and upon the feature game being triggered, conducting the feature game, wherein an outcome of the feature game is determined at least in part based on a number of special symbols displayed at the conclusion of the feature game.

In a fourth aspect of the disclosure, there is provided an electronic method of gaming comprising: selecting a first set of symbols from respective ones of a first set of reel strips by randomly selecting stopping positions for each of the reel strips; causing an electronic display to display the first set of symbols at a first set of display positions, the first set of display positions being arranged in a plurality of columns set side by side, each column of positions corresponding to a respective one of the first set of reel strips; evaluating the first set of symbols to determine whether the first set of symbols incorporates one or more winning combinations for which an award should be made; randomly selecting stopping positions for a second set of reel strips, wherein the second set of reel strips corresponds to a second set of display positions, each display position of the second set of display positions having an overlapping spatial relationship with a corresponding one of the first set of symbol display positions, wherein any symbols displayed at the second set of display positions are displayed as being at least partially transparent to enable at least part of the symbol displayed at the corresponding symbol position of the first set of display positions to be seen, and wherein each second reel strip has a special symbol at one or more reel strip positions; triggering a feature game upon at least a designated number of special symbols being displayed after the second set of reel strips are stopped; and conducting the feature game, wherein an outcome of the feature game is determined at least in part based on a number of special symbols displayed at the conclusion of the feature game.

In an embodiment, conducting the feature game comprises conducting a series of free games.

In an embodiment, conducting the series of free games comprises retaining for subsequent display previously displayed special symbols.

In an embodiment, the method comprises selecting, in each free game, one or more new stopping positions for the second set of reel strips.

In an embodiment, each reel strip of the second set of reel strips is an individual reel corresponding to an individual display position.

In an embodiment, each second reel strip has one or more blank reel strip positions having no symbol, each blank symbol position being displayed as being transparent.

In an embodiment, each overlay reel strip consists of reel strip positions having special symbols and blank reel strip positions.

In an embodiment, the method comprises increasing a number of free games remaining in response to the selection of one or more additional special symbols in at least one of the free games.

In an embodiment, each special symbol is a configurable symbol, and the method comprises configuring at least any displayed configurable symbols, each configurable symbol being configured by having a prize assigned.

In an embodiment, the method comprises configuring each configurable symbol prior to selecting a stopping position of for a respective reel.

In an embodiment, the method comprises receiving a player selection of a subset of the second set of display positions, and wherein the outcome of the feature game is also determined at least in part based on a number of configurable symbols displayed in the subset of the second set of display positions at the conclusion of the feature game.

In an embodiment, a multiplier is awarded if configurable symbols occupy all display positions of the subset of the second set of display positions.

In an embodiment, the method comprises conducting the feature game using only the second set of display positions.

In a fifth aspect of the disclosure, there is provided an electronic gaming system comprising: an electronic display; a memory storing program code; and at least one processor executing the program code to: select a first set of symbols from respective ones of a first set of reel strips by randomly selecting stopping positions for each of the reel strips; cause the electronic display to display the first set of symbols at a first set of display positions, the first set of display positions being arranged in a plurality of columns set side by side, each column of positions corresponding to a respective one of the first set of reel strips; evaluate the first set of symbols to determine whether the first set of symbols incorporates one or more winning combinations for which an award should be made; randomly select stopping positions for a second set of reel strips, wherein the second set of reel strips corresponds to a second set of display positions, each display position of the second set of display positions having an overlapping spatial relationship with a corresponding one of the first set of symbol display positions, wherein any symbols displayed at the second set of display positions are displayed as being at least partially transparent to enable at least part of the symbol displayed at the corresponding symbol position of the first set of display positions to be seen, and wherein each second reel strip has a special symbol at one or more reel strip positions; trigger a feature game upon at least a designated number of special symbols being displayed after the second set of reel strips are stopped; and conduct the feature game, wherein an outcome of the feature game is determined at least in part based on a number of special symbols displayed at the conclusion of the feature game.

In a sixth aspect of the disclosure, there is provided a gaming machine comprising: a display; a credit input mechanism operable to establish credits on the gaming machine, the credit input mechanism including at least one of a coin input chute, a bill collector, a card reader and a ticket reader; meters configured for monitoring credits established via the credit input mechanism and changes to the established credits due to play of the gaming machine, the meters including a credit meter to which credit input via the credit input mechanism is added and a win meter; a random number generator; a game play mechanism including a plurality of buttons configured for operation by a player to input a wager from the established credits and to initiate a play of a game; and a game controller comprising a processor and memory storing (i) game program code, and (ii) a plurality of reel strips, the game controller executing the game program code stored in the memory and responsive to initiation of the play of the game with the game play mechanism to: select a first set of symbols from respective ones of a first set of reel strips by randomly selecting stopping positions for each of the reel strips; cause the display to display the first set of symbols at a first set of display positions, the first set of display positions being arranged in a plurality of columns set side by side, each column of positions corresponding to a respective one of the first set of reel strips; evaluate the first set of symbols to determine whether the first set of symbols incorporates one or more winning combinations for which an award should be made; randomly select stopping positions for a second set of reel strips, wherein the second set of reel strips corresponds to a second set of display positions, each display position of the second set of display positions having an overlapping spatial relationship with a corresponding one of the first set of symbol display positions, wherein any symbols displayed at the second set of display positions are displayed as being at least partially transparent to enable at least part of the symbol displayed at the corresponding symbol position of the first set of display positions to be seen, and wherein each second reel strip has a special symbol at one or more reel strip positions; trigger a feature game upon at least a designated number of special symbols being displayed after the second set of reel strips are stopped; and conduct the feature game, wherein an outcome of the feature game is determined at least in part based on a number of special symbols displayed at the conclusion of the feature game.

In a seventh aspect, the disclosure provides computer program code which when executed by at least one processor implements the above method.

In an eight aspect, the disclosure provides a tangible computer readable medium comprising the computer program code.

BRIEF DESCRIPTION OF THE DRAWINGS

Features and advantages of certain embodiments of the present disclosure will become apparent from the following description of embodiments thereof, by way of example only, with reference to the accompanying drawings, in which.

Figure 1:
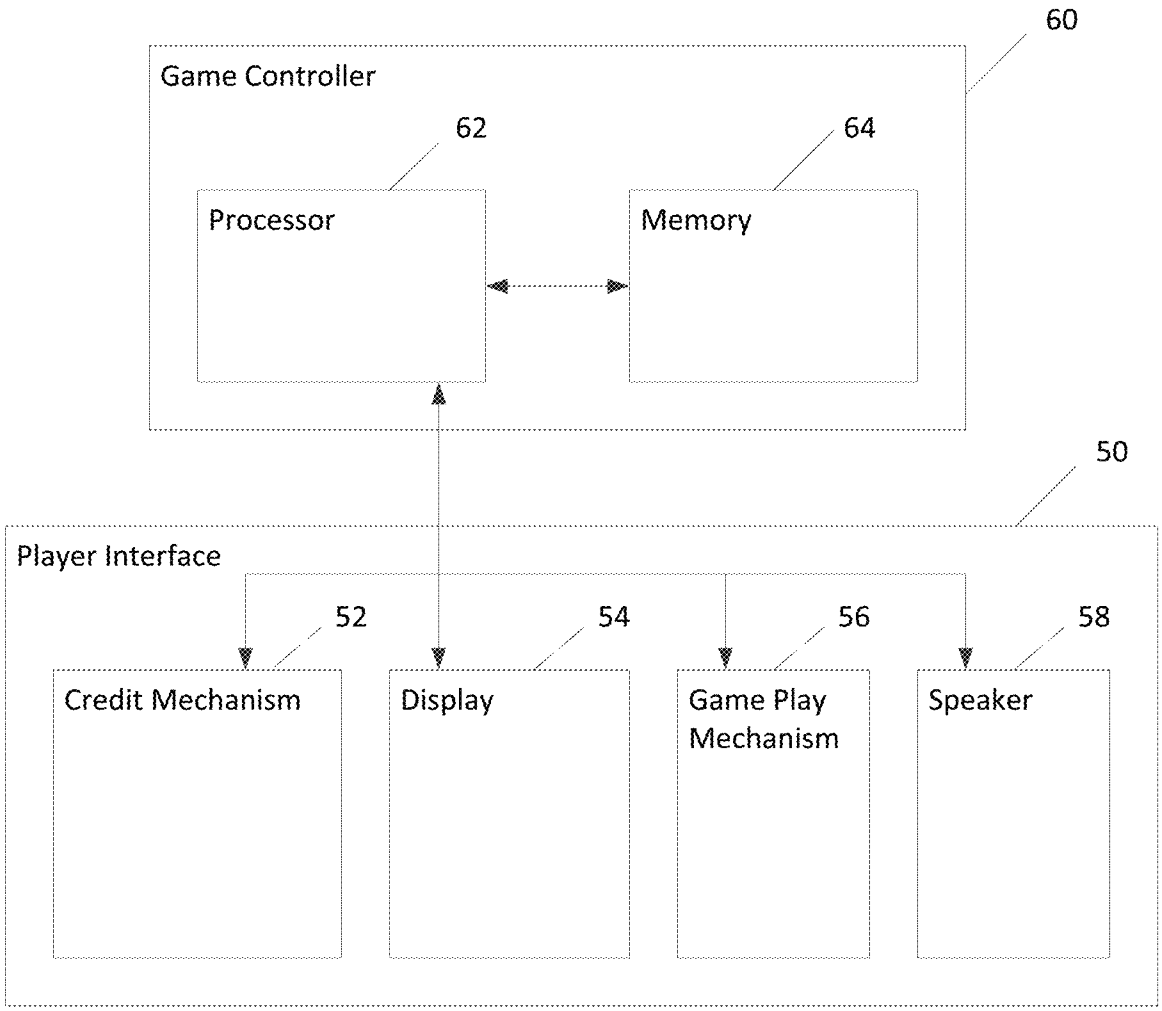
FIG. 1 is a block diagram of the core components of a gaming system.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present disclosure is not limited to the arrangements and instrumentality shown in the attached drawings.

DETAILED DESCRIPTION

Referring to the drawings, there are shown example embodiments of gaming systems having components which are arranged to implement a game where a secondary game is conducted using the same displayed game play area as the primary game. In one example, the primary game is conducted using a first set of reels and a secondary game is conducted using a second set of reels. In one example, the second set of reels are overlay (or "ghost") reels which are displayed as overlapping the first set of reels. The secondary game consists of a pre-trigger phase where play of the secondary game is conducted concurrently with play of the primary game within the same game play area. The pre-trigger phase involves determining whether a trigger condition is met and a feature or "bonus" game phase which follows the trigger condition occurring.

The use of techniques such as overlay reels to conduct the secondary game within the same displayed game play area as the primary game, enables a feature game to be added to an existing game without modifying the rules of the primary game. In one example, an ante bet is used to fund the secondary game so that it is not necessary to take any steps to adjust the return to player of the primary game (e.g. by modifying reel strips). In this way game play of an existing game, such as a well-known or classic game can be provided as the primary game and enhanced by the secondary game without changing the essential characteristics of the existing game. Further, employing overlay reels enables the primary and secondary games to be conducted within a single game play area on a single screen. In other embodiments, the secondary game can be conducted in the same play area using other techniques. In one example, the underlying and overlaying reels overlap in different display depths—e.g. the underlying and overlaying symbols may look totally overlap from one viewing angle, but slightly de-overlap at an offset angle. In another example, the underlying and overlaying symbols occupy the same symbol position but at different times. E.g. The primary game results are displayed, then at least any primary game symbols corresponding to symbols which are relevant to the outcome of the secondary game disappear and are briefly replaced (e.g. in an alternating manner) by at least relevant symbols spun up in the secondary game (e.g. symbols that contribute to the outcome of the secondary game), before reverting to the next primary game (if feature not triggered) or continuing to the feature (if feature triggered). In other examples, the relative positions of the primary and secondary games are exchanged so that the primary game overlaps the secondary game.

Advantageously, the feature game employs a prize awarding mechanism where the number and/or display position of special, designated symbols that are collected in the feature game, controls whether a prize is awarded and the size of the prize. In one example, the special symbols are the trigger symbols that trigger the feature game. In a specific example, the special symbols are configurable symbols and the gaming system incorporates a mechanism that enables the symbols to be configured. In an advantageous embodiment, the second set of overlay reel strips are formed from partially transparent configurable symbols and "blank" reel strip positions. This minimizes the extent to which the underlying symbols of the primary game are obscured. The configurable symbols comprises a variable portion which is indicative of the value of a prize. In examples employing configurable symbols, when the feature game is triggered, the player is guaranteed to at least win the accumulated value of the prizes indicated by the variable portions of the configurable symbols.

In an embodiment, when the feature game is triggered, the player selects a subset of display positions. If configurable symbols are selected for display for those player-selected positions an additional award is made in the form of a multiplier which is applied to the award from the feature game.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2:
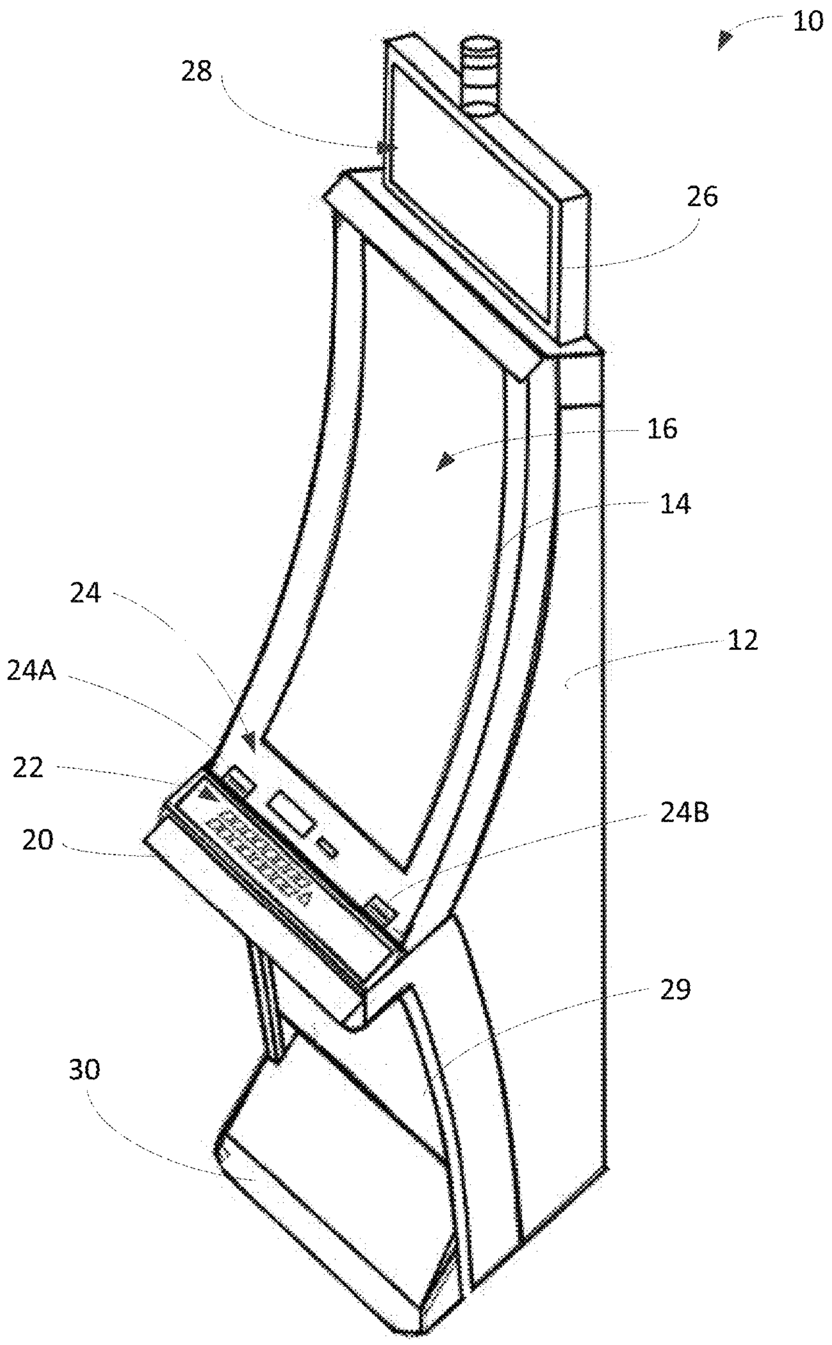
FIG. 2 is a perspective view of a standalone gaming machine.

A gaming system in the form of a standalone gaming machine 10 is illustrated in FIG. 2. The gaming machine 10 includes a console 12 having a display 14 (also described as a screen herein) on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a liquid crystal display. Alternatively, the display 14 may be a OLED, plasma screen, any other suitable video display unit. The top box 26 may also include a display, for example a video display unit, which may be of the same type as the display 14, or of a different type.

Figure 3:
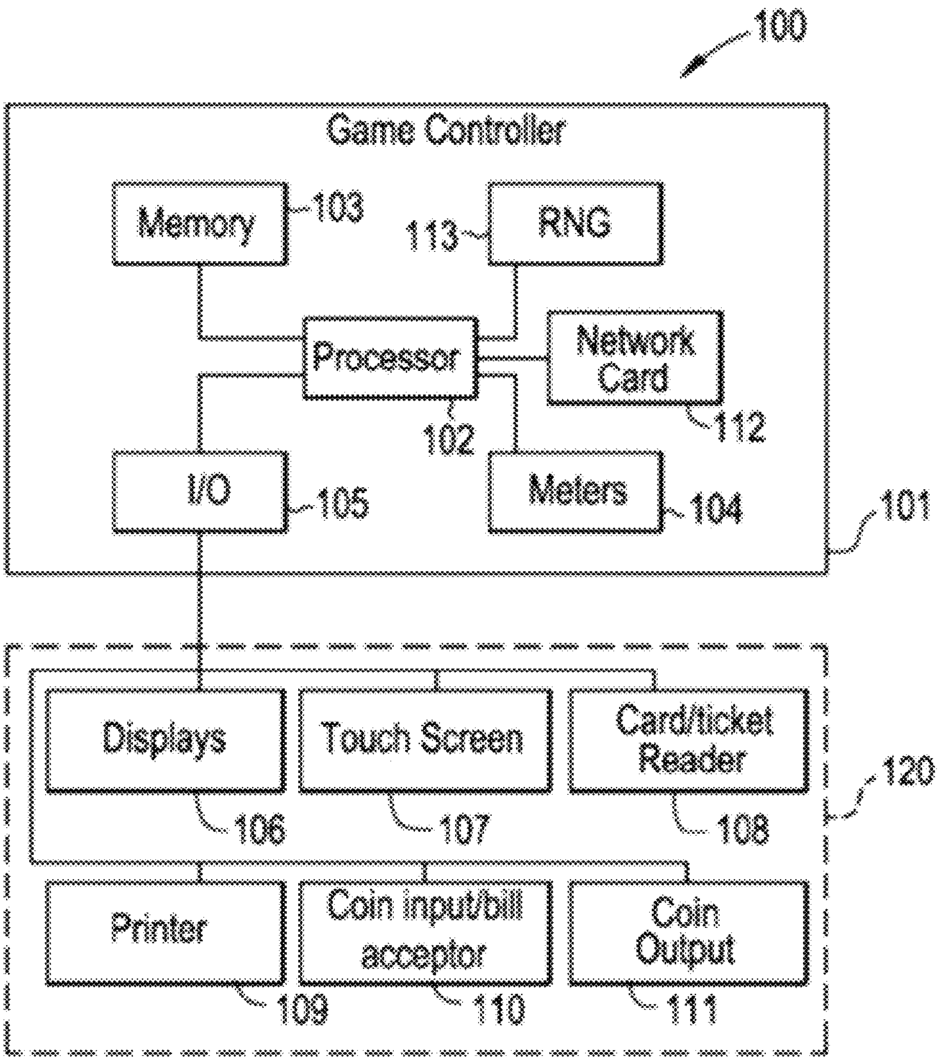
FIG. 3 is a block diagram of the functional components of a gaming machine.

FIG. 3 shows a block diagram of operative components of a gaming machine 100 which may be the same as or different to the gaming machine 10 of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine 100 has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112.

The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
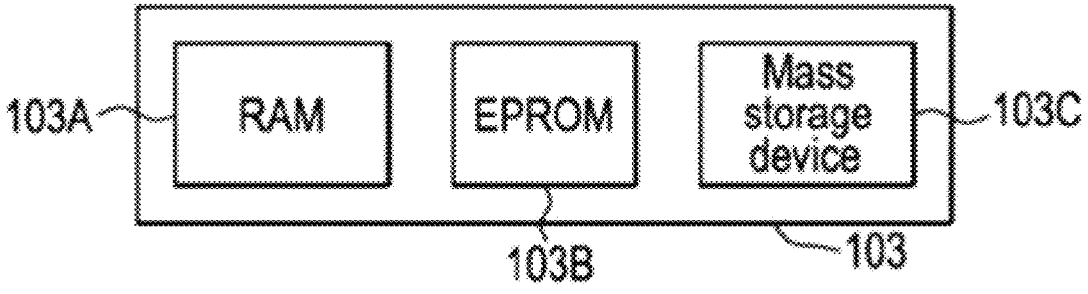
FIG. 4 is a schematic diagram of the functional components of a memory.

FIG. 4 shows a block diagram of the main components of a memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices, such as, the one or more displays 106, touch screen and/or buttons 107, card and/or ticket reader 108, printer 109, bill acceptor and/or coin input mechanism 110, and coin output mechanism 111, to be provided remotely from the game controller 101.

Figure 5:
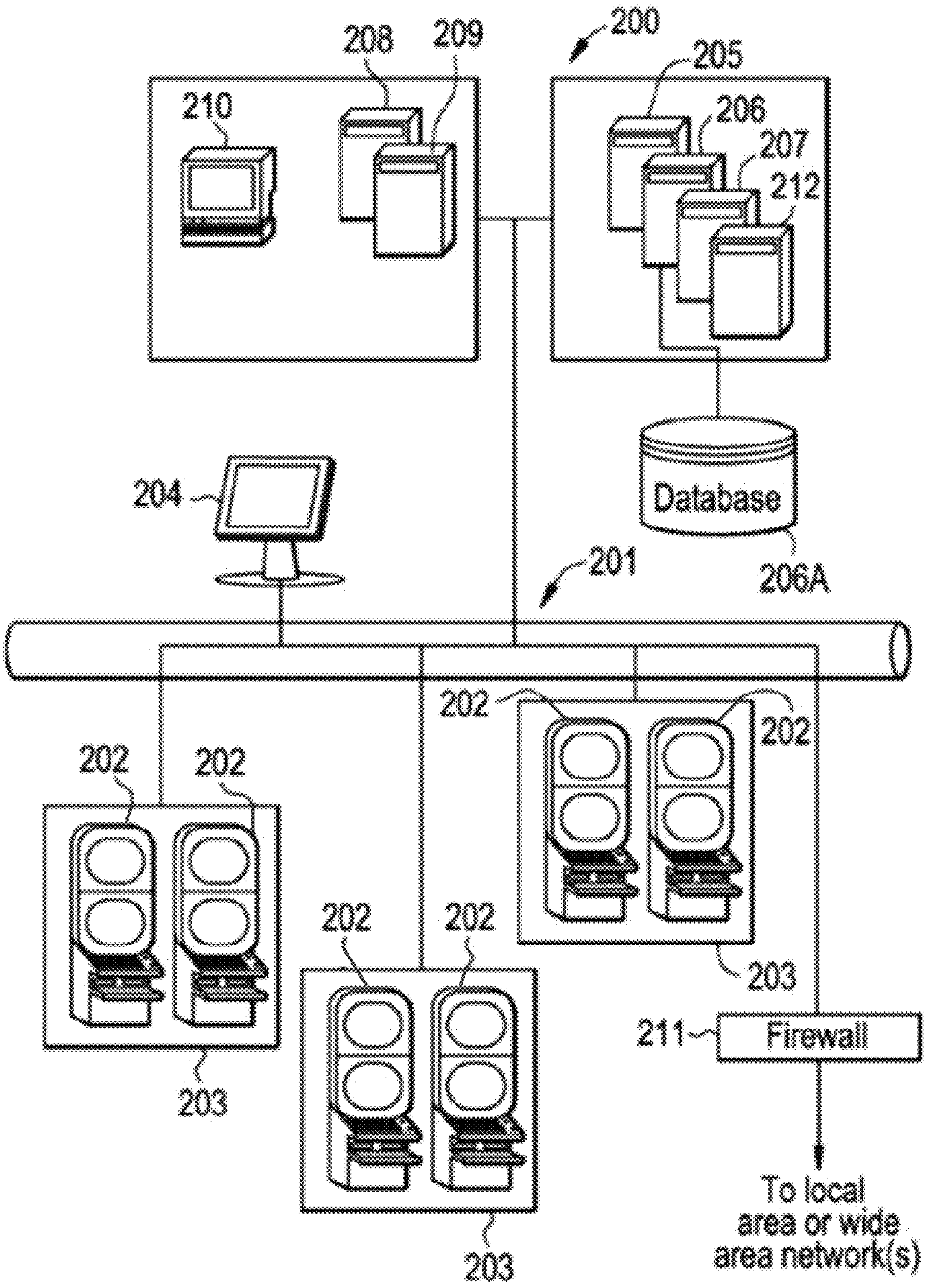
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10 and 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming machines 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming system 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager which will be evaluated for this play of the game and initiates a play of the game. In the example shown in FIG. 9, the player selects how much to bet per line (there are 20 lines) and this amount is multiplied by 40 credits. This wager has a built-in ante bet such that the player's wager covers both the primary game and the secondary game. In other embodiments, the player may have the option as to whether to place the ante bet and the secondary game is only active when the ante bet is made.

In other example embodiment, the player may select how many lines to play in the primary game choosing from a number of different options ranging between the minimum of one line and the maximum number of lines allowed by the game, in this case, 20 lines.

The pay lines are formed by a combination of display positions, one from each column of display positions, the display positions typically being located relative to one another such that they form a line. In a non-individual-reel arrangement, each column is associated with symbols from a single reel strip (e.g. 3 consecutive symbols are selected from a reel strip to populate a column of 3 display positions). Alternatively, in an individual-reel arrangement, each column is associated with symbols from multiple reel strips (e.g. 3 symbols are selected independently from respective ones of individual reel strips to populate a column of 3 display positions). In some embodiments, the number of play lines are fixed. The gaming machine is configured to determine whether the selected symbols include winning combinations as specified by a pay table on active pay lines.

Persons skilled in the art will appreciate that in other embodiments, other mechanisms may be used to evaluate whether the symbols and this will affect the manner in which a wager is made. For example, other embodiments may use a ways to win type mechanism such as those marketed under the trade name "Reel Power" by Aristocrat Leisure Industries Pty Ltd. In such embodiments, the player selects a number of reels to play. The selection of the reel means that each displayed symbol of the reel can be substituted for a symbol at one or more designated display positions. In other words, all symbols displayed at display positions corresponding to a selected reel can be used to form symbol combinations with symbols displayed at a designated, display positions of the other reels. For example, if there are five reels and three display positions for each reel such that the display positions comprise three rows of five display positions, the symbols displayed in the center row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 35 or 243 ways to win.

Figure 6:
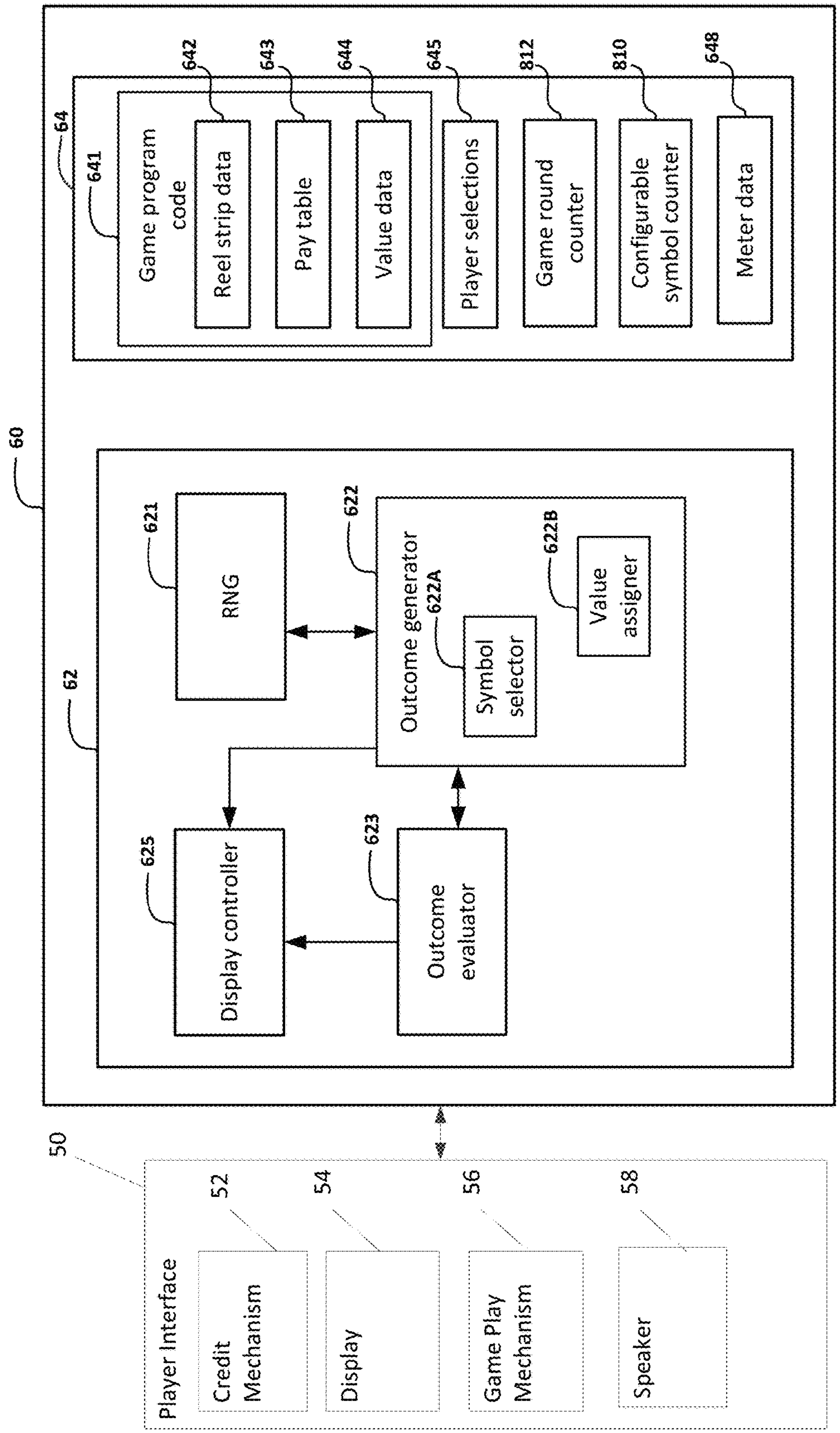
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by outcome evaluator 623. The first part of forming the game outcome, for example in the primary game, is for a symbol selector 622A to select one or more symbols from a reel strip using reel strip data 642 using random number generator 621. The selected symbol(s) are advised to the display controller 625 which causes them and/or nearby symbol(s) on the reel strip to be displayed as a symbol display on display 54 at a set of display positions. For example, the 10th symbol on a 30-symbol reel strip may be selected by the symbol selector 622A, causing a display of the 9th, the 10th and the 11th symbol to form a column of 3 symbols. The symbols being displayed may be comprised of, more than, fewer than, or different to the selected symbol(s). For example, in some cases symbols that aren't evaluated as part of the game outcome may be displayed outside of an evaluation area to show, for example, which symbol was next on the reel strip. In some cases the selected stopping position is not occupied by a symbol, that is a blank reel strip position is selected. Accordingly, a selection by the symbol selector 622A need not result in a symbol display, but may instead result in a blank reel strip position being selected, for example, for display in a partially transparent form (e.g. a translucent overlay) or representation in a fully transparent form (e.g. hidden to allow visibility through to the underlying symbol). As will be described below, in embodiments of the disclosure, symbols and/or stopping positions are selected from a first set of reel strips for a primary game and from a second set of overlay reel strips for a secondary game.

In embodiments described, the display positions of the symbol display are arranged in a rectangular matrix comprising five columns and three rows. However, other arrangements could be employed in embodiments of the disclosure. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns of three symbols so that the middle two symbols in the columns of four symbols share boundaries with three symbols of each neighboring column. As mentioned above, symbols in each column may be associated with symbols from a single reel strip (i.e. a non-individual reel arrangement) or multiple reel strips (i.e. an individual reel arrangement).

Figure 7:
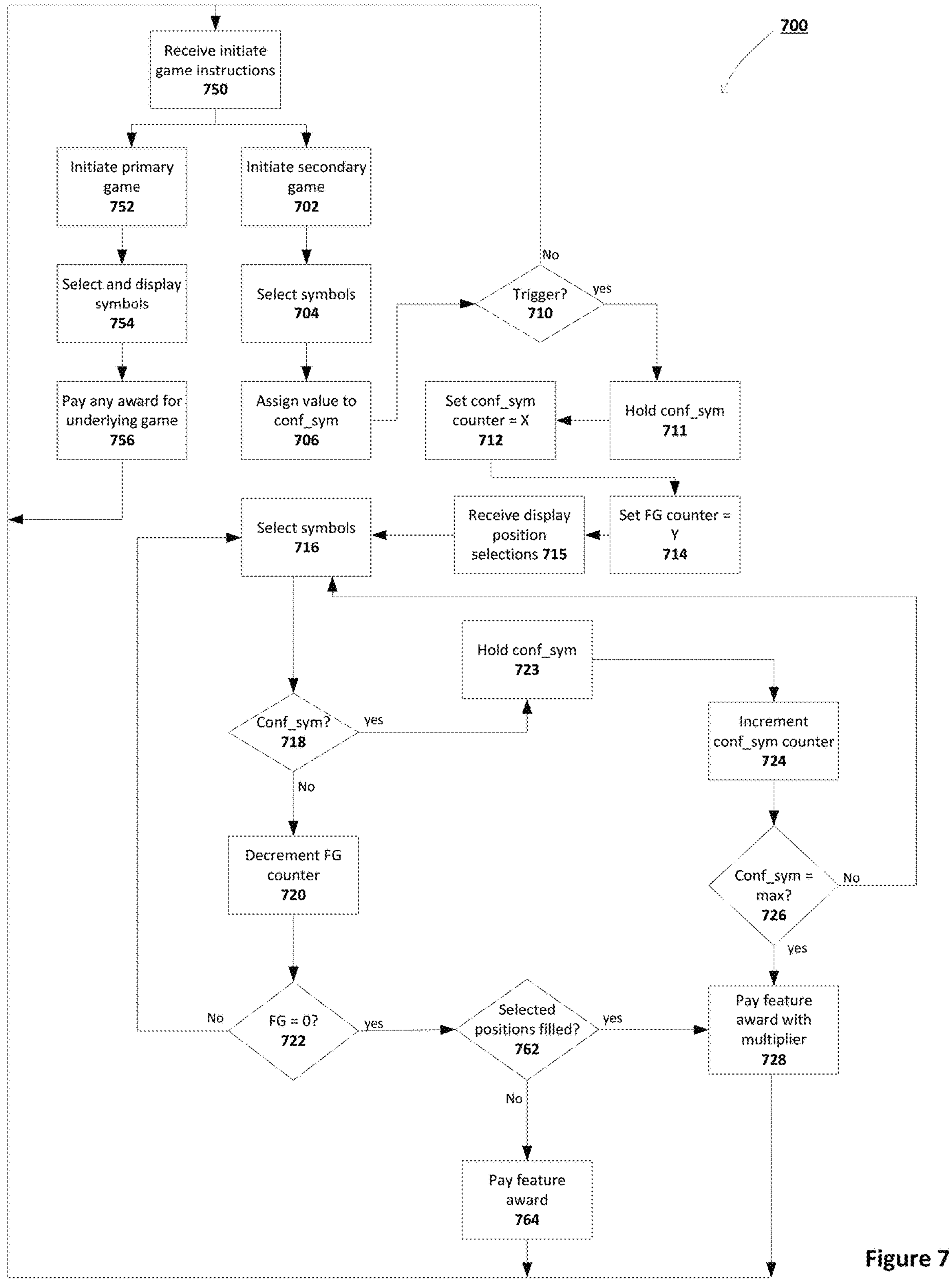
FIG. 7 is a flow diagram of an embodiment of a method of implementing a game.

FIG. 7 shows a flow diagram implemented by the game controller 60 in one embodiment. In this embodiment, all wagers incorporate an ante bet such that both the primary, underlying game and secondary, overlay game are conducted in each play of the game. Further, this embodiment is described as a non-individual reel arrangement, but a skilled person would appreciate that the description is equally applicable, with minor modifications, to individual-reel arrangements.

When the player presses spin button 955, the game controller 60 receives an initiate game instruction at step 750. At step 752, the game controller 60 initiates a primary underlying game and at step 754, the symbol selector 622A selects a first set of symbols from a first symbol set using a first random process. In an example, the first symbol set comprises a first set of reel strips defined by reel strip data 642 and the first random process comprises using symbol selector 622A to select stopping positions for each of the first set of reel strips using values returned from the random number generator 621. The selected symbols are displayed at respective ones of a first set of display positions arranged on display 54. As indicated above, the first set of display positions are arranged in a plurality of columns. In this example, respective ones of the first set of reel strips correspond to respective ones of the columns. In another example, the first random process comprises selecting symbols from individual reel strips corresponding to individual ones of the display positions. At step 756, the outcome evaluator 623 evaluates the first set of symbols based on a primary game pay table 643 and pays any awards for winning combinations by crediting them to the win meter which is stored as meter data 648 in memory 64.

At step 702, the secondary game is initiated. The secondary game is conducted in parallel (e.g. concurrently) with the primary game, where control does not return to step 750 until the secondary game is also complete. At step 704, the secondary game comprises conducting a second random process using symbol selector 622A to select stopping positions of a second set of overlay reel strips defined by reel strip data 642. In this example, any symbols selected for display by the second random process are displayed at respective ones of a second set of display positions that overlays the first set of display positions arranged on display 54. In one embodiment, each reel strip of the second set of reel strips comprises one or more configurable symbols and one or more blank reel strip positions. In other embodiments, the blank reel strip positions are instead occupied by other, non-configurable symbols. In this context, it will be appreciated that the term "display position" is used to reference positions at which symbols are or could be displayed and which are used in the evaluation of game outcomes. That is, as described above, in some embodiments where a blank reel strip positions is selected for a particular display position, nothing will be displayed at the position such that the underlying symbol is completely visible or a translucent effect is applied to signify a blank position. In other embodiments, all reel strip positions have a translucent background and at blank reel strip positions there is also a translucent background through which the underlying symbol can be perceived. Thus, in one example, after stopping positions have been selected, the display positions will be either be occupied by configurable symbols or be unoccupied.

Herein the concept of a second set of display positions is used to clarify that the second set of symbol positions is distinct from the first set of display positions in the sense that symbols at the first and second set of display positions do not interact in the determination of game outcomes. However persons skilled in the art will appreciate that visually, corresponding display positions appear as a single display position that can be occupied by both an underlying and an overlying symbol. As indicated above, in some embodiments, the second set of display positions may be displayed at a different display depth so they overlay the first set of display positions from certain viewing angles.

Figure 9:
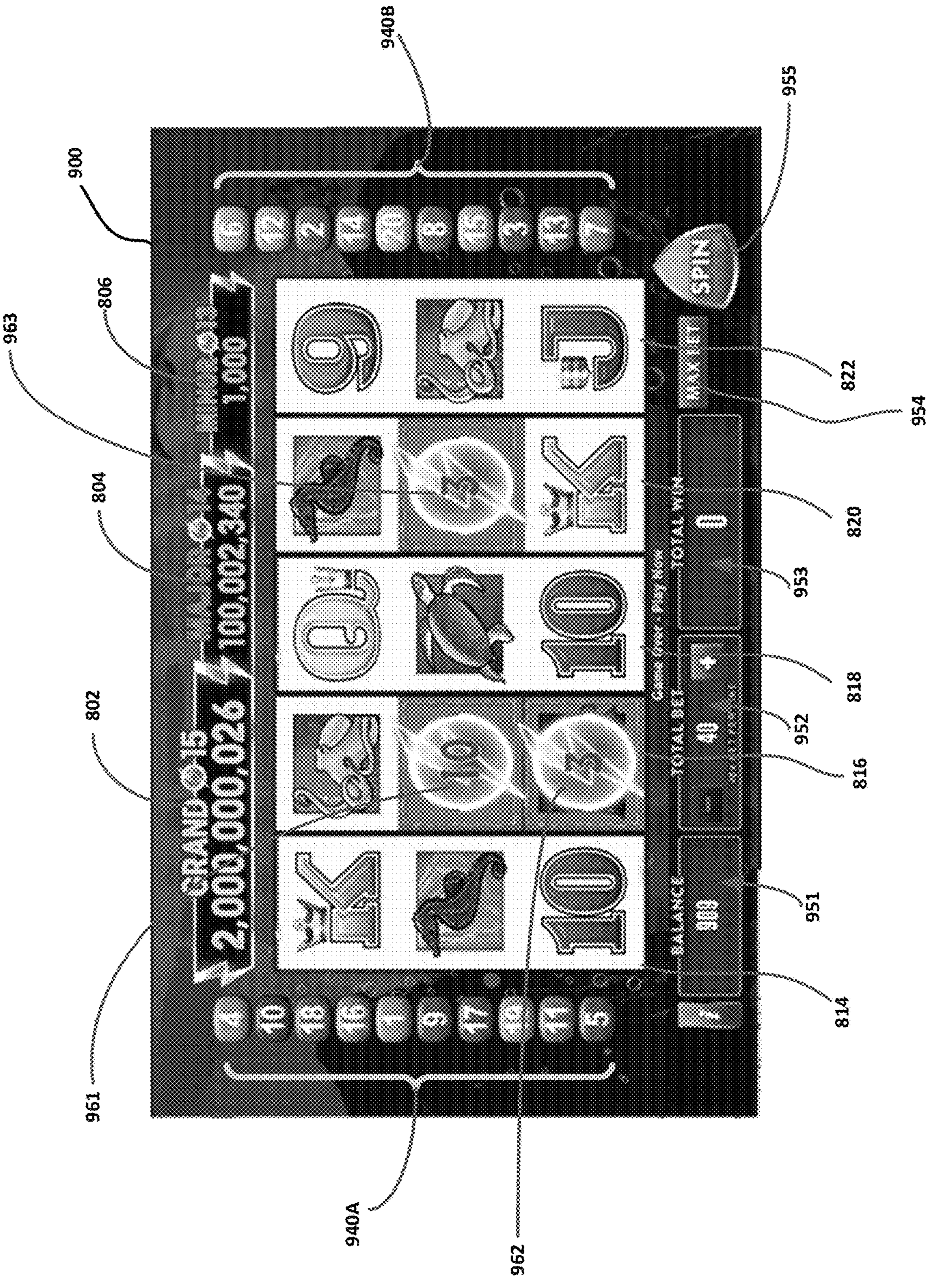
FIGS. 9, 10 and 11 are exemplary screen shots of parts of a game implemented by the embodiment of FIG. 7.
Figure 10:
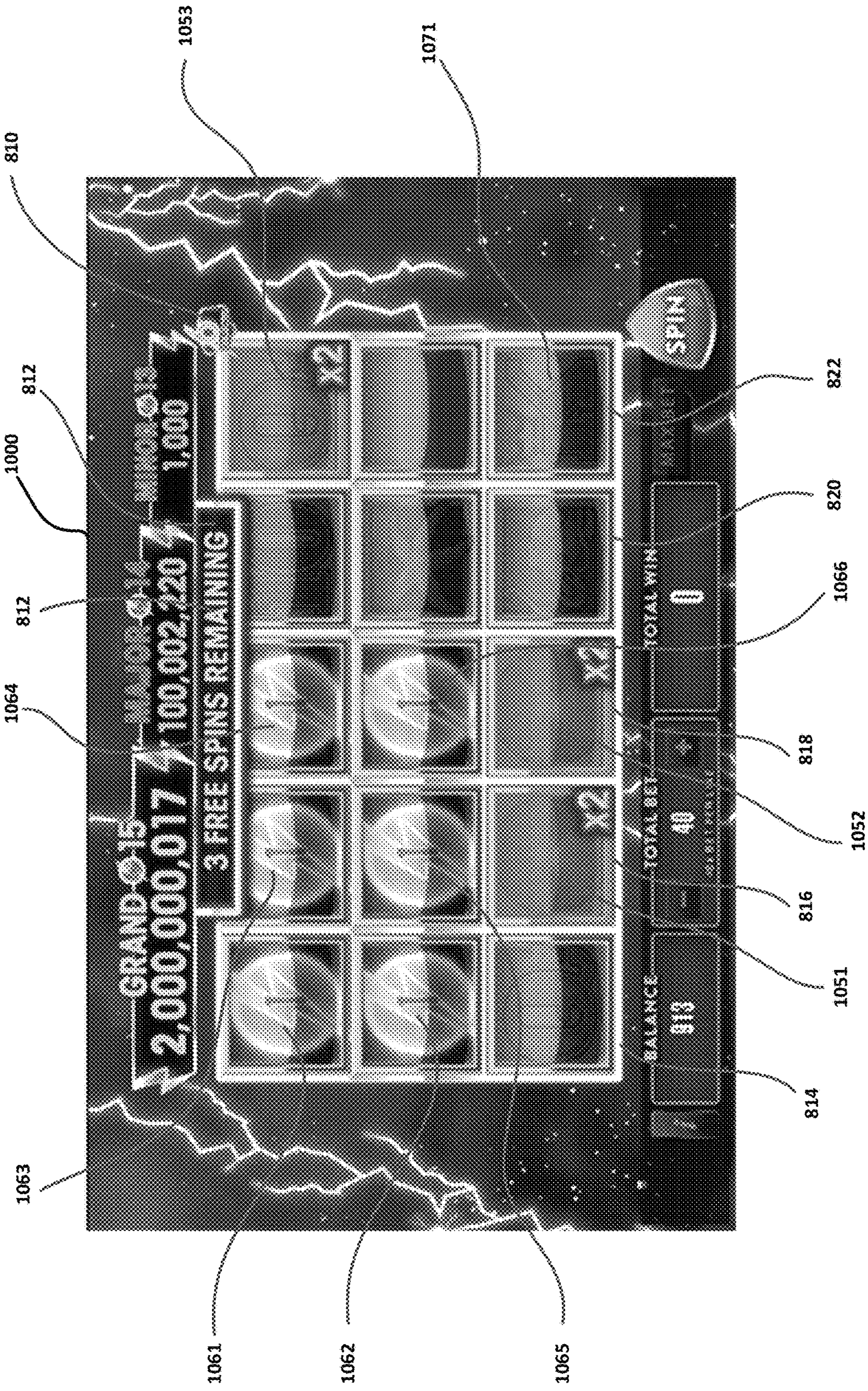
Figure 11:
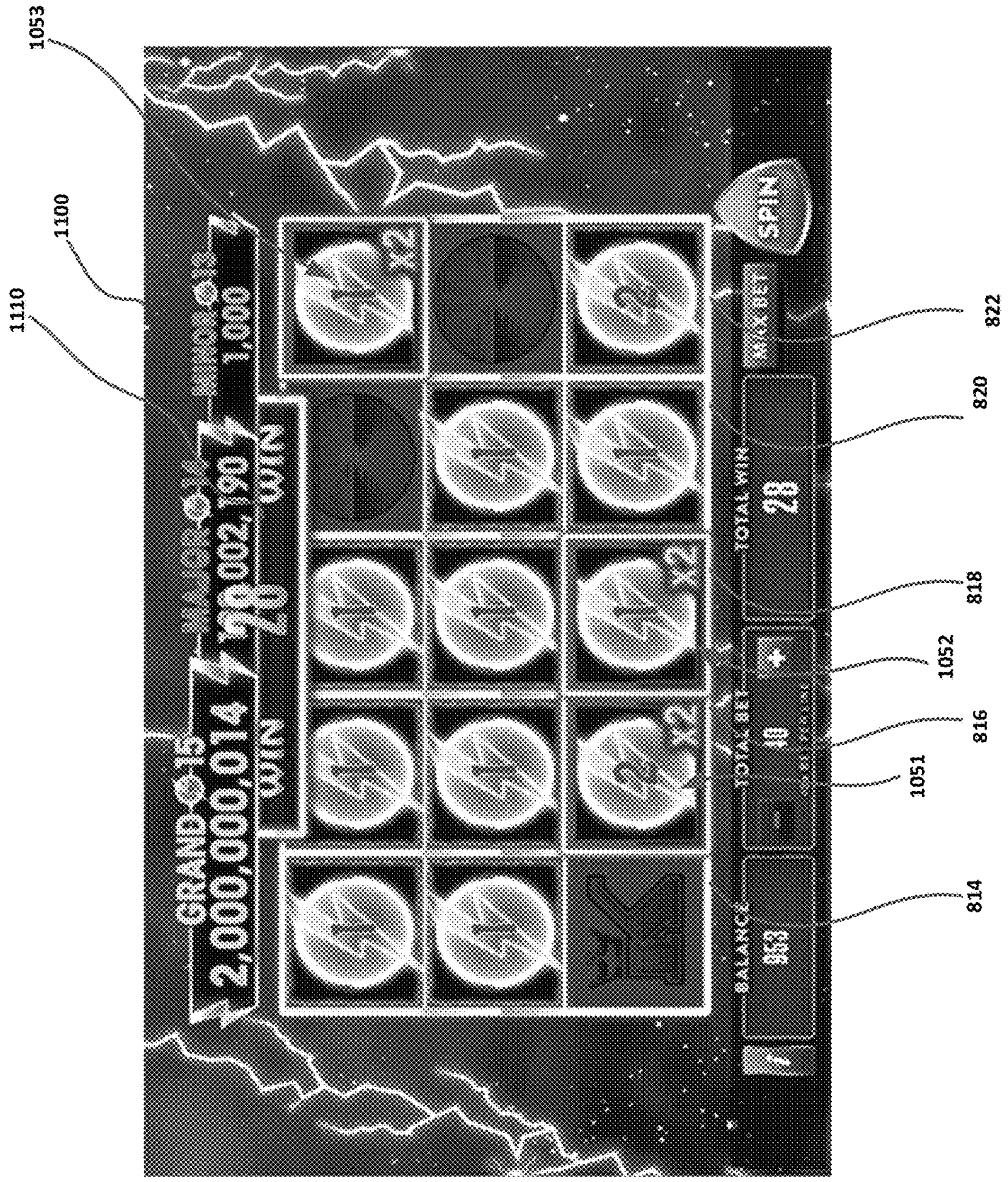

In an embodiment, the configurable symbols each comprise at least a common component and at least a variable component. The variable component is indicative of a value of a prize that is associated with each of the configurable symbols. An example of a configurable symbol is shown in FIGS. 9, 10 and 11, in the form of a round symbol (e.g. configurable symbol 961) having a lightning bolt extending through it. The common component is the outline of symbol and the lightning bolt. The variable component is the indicia overlaying the common component. In the case of configurable symbol 961, the numeral "10" which is directly indicative of the value of a possible contribution to a prize by the configurable symbol. In other embodiments, the indicia indirectly may indicate the value of the prize. For example, a "major" indicia can indicate a major jackpot prize. It will be appreciated that the indicia can also be in other forms, which may also be indicative of a prize. For example, an icon indicating that the player has the opportunity to, or has, won a car. In some embodiments, the indicia may indicate only a portion of a prize. Continuing with the car example, the car icon may be split into four portions, each portion being assigned to a different configurable symbol. In such embodiments, all four portions of the car icon are required to be selected for display in order for the car prize to be won. In another example, the configurable symbol may have an alternative visual representation, for example, a door which opens once the configurable symbol is displayed in a display position to reveal the assigned prize value.

In one embodiment, at least one value of the respective prizes is generated by randomly selecting one of a plurality of predefined multipliers to apply to a base value derived from the amount wagered. In one example, the base value may be derived from the amount wagered per line in the current play of the game. In another example, the base value may be derived from the portion of the wager set aside for the secondary game. This is accomplished at step 706 using value assigner 622C, which selects the predefined multipliers from value data 644, applies the multiplier to the value to obtain a prize value and assigns the prize value to each of the configurable symbols selected by symbol selector 622A. The plurality of predefined multipliers in this embodiment are selected by symbol selector 622A at random according to a weighted probability based at least in part on the amount wagered on the base game. In an embodiment, the assignment of values to the configurable symbols is performed by the value assigner 622C after the symbols have been selected and the game controller is informed that they will be displayed but before they are displayed on the display. In another embodiment, the assignment occurs after the symbols have been displayed on display 54. In yet another example, the configurable symbols must be touching another configurable symbol before a value is assigned.

In another embodiment, the variable prizes may be randomly selected under the control of value assigner 622C from a set of available prizes. Specific prizes may be weighted so as to control the probability of certain prizes occurring. In some embodiments, there may be a plurality of sets of prizes and the value assigner 622C may be configured to choose the set of prizes from which values will be randomly selected on the basis of a player's wager.

Returning to FIG. 7, at step 710, outcome evaluator 623 monitors play of the secondary game and determines whether a trigger event has occurred. In this embodiment, a trigger event occurs when six configurable symbols appear on display 54. If a trigger event has not occurred, the secondary game ends and the game controller reverts to waiting for the player to initiate a further game.

Figure 8:
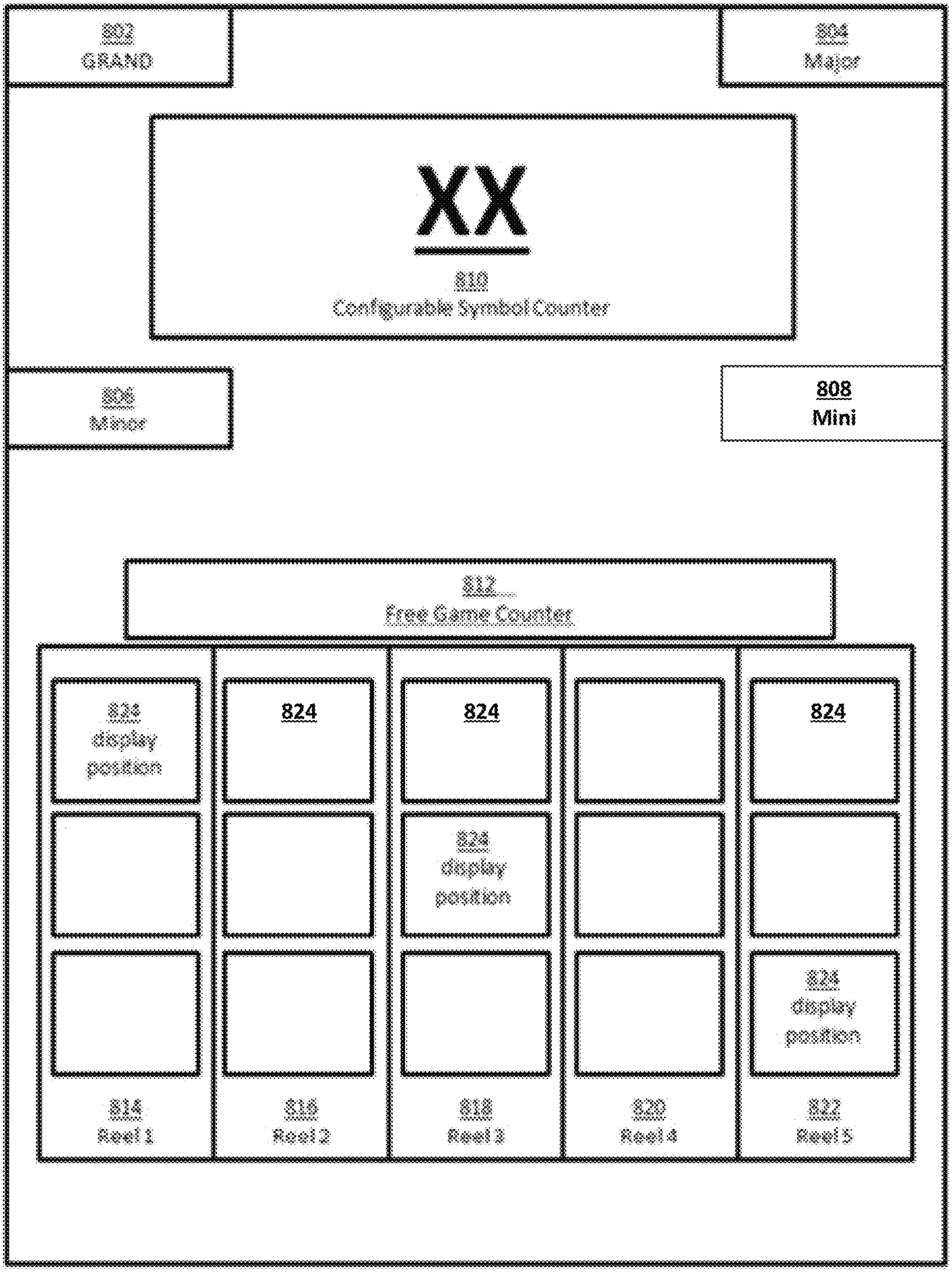
FIG. 8 is a representation of a screen of a feature game conducted during play of a secondary game.

If the outcome evaluator 623 determines that a trigger event occurs, a feature game initiates. A feature game may include iterations, such as a number of "free games" as described in examples below. On initiation of the feature game at step 711, the configurable symbols are held or retained (e.g. persistently displayed during the feature game or across the multiple free games) in their respective display positions 824 as shown in FIG. 8.

From the above, it will be appreciated that the possible outcomes of the second random selection process include a first type of outcome where at least a designated number of configurable symbols is selected and hence the feature game is triggered, and a second type of outcome where less than the designated number of configurable symbols is selected and hence the feature game is not triggered.

In other embodiments, more than or less than six symbols will be required to trigger the feature game, or the feature game will be modified in a way that is proportional to the number of configurable symbols that are displayed to trigger the feature game. For example, the average or total prize achievable in the feature game may be increased in proportion to the number of configurable symbols appearing.

Another set of possible outcomes include a first type of outcome where at least a designated number of configurable symbols is selected for display in a predefined set of display positions, and a second type of outcome where less than the designated number of configurable symbols is selected for display in the predefined set of display positions. In a first arrangement, the predefined set of display positions may include a set of absolute display positions. For example, the feature game is triggered upon at least 3 out of 4 corner display positions in a 5×3 display matrix being occupied by configurable symbols, regardless of symbol occupancy in non-corner display positions. As another example, the feature game is triggered upon all display positions in the first two columns of the 5×3 display matrix being occupied by configurable symbols, regardless of symbol occupancy in other columns. In a second arrangement, the predefined set of display positions may include a set of relative display positions. For example, the feature game is triggered upon any 2×2 cluster of display positions within a 5×3 display matrix being occupied by configurable symbols. As another example, the feature game is triggered upon any row of display positions within a 5×3 display matrix being occupied by configurable symbols. In either arrangement, the predefined set of display positions may be different in different iterations of the secondary games (e.g. change from any 2×2 cluster to any 3×3 cluster, or change from any one row to any two rows).

When the trigger condition is met, the configurable symbol counter 810 of FIGS. 8 and 10 is set to an initial value, in this embodiment, the number of configurable symbols that are held on reels 814-822 at step 712. The value of the configurable symbol counter 810 is also stored in memory 64. In an embodiment, this is also the number of configurable symbols which originally triggered the feature game. That is, in this embodiment, the configurable symbol counter 810 is initially set to 6, as six configurable symbols are required to trigger the feature game. In other embodiments, there may be no held configurable symbols at the start of the feature game. In other embodiments, the positions of the held configurable symbols could be changed at the start of the feature game.

Once configurable symbol counter 810 is set, control moves to step 714 which sets free game counter 812 to a number of free games. In an embodiment, the number of free games is predefined as three free games, so the free game counter 812 is set to 3. The value of the free game counter 812 is also stored in memory 64. In other embodiments, the number of free games may be more than or less than three, or may be derived by the game controller from the number of configurable symbols that appear when the trigger event occurs. For example, an additional free game may be offered for each configurable symbol that appears in addition to a predefined minimum required to trigger the feature game.

At step 715, the player is given the opportunity to select a number of display positions from the second set of display positions. In the example of FIG. 10, this is three display positions, and the player has selected display positions 1051, 1052 and 1053. In this example, the player's selections are constrained to be within display positions not already occupied by configurable symbols that formed part of the trigger event. The player selections 645 of display positions are set in memory 64. Additionally, the player selections 645 are indicated on the display, for example by an indicative boundary around, and/or with a multiplier indicia such as "×2", for each of the player-selected display positions.

Then a third random process is conducted which has the potential to result in additional configurable symbols being displayed at second display positions not already displaying a configurable symbol, via display controller 625 at step 716.

In one example of a third random process, the symbol selector 622A selects symbols from a different, third set of reel strips during the feature game. In this example, there are five reel strips used in the pre-trigger phase of the secondary game which correspond to respective ones of the five reels. In this example, in the feature game part of the secondary game, individual reel strips are associated with each of the display positions. That is, if there are fifteen display positions, fifteen reels are associated with individual ones of the second display positions. Each of the reels comprises a mixture of blank reel strip position(s) and reels strip positions occupied by configurable symbol(s). Before the feature game, the configurable symbol counter is set to an initial value. In this example, the initial value is the number of triggering configurable symbols. In another example, the initial value may be zero. In such an example, the trigger symbols can be different to the symbols used in the free games.

In the first free game, the symbol selector 622A in this example determines stopping positions for the individual reel strips corresponding to display positions which are not occupied by configurable symbols held from the triggering of the feature game. If any of the reels are stopped with a configurable symbol occupied, that configurable symbol or its associated prize value is held, such as by holding/locking the display position (e.g. not spinning the held individual reels in a subsequent free game to ensure prize accumulation), or by locking in the prize value as the minimum accumulated prize (e.g. allowing re-spin of the held individual reels in a subsequent free game to potentially increase but not decrease the prize value for that display position). Thus, in some examples, only the display positions where a configurable symbol has not been displayed are used for further stopping position selection in subsequent free games. In other examples, all display positions are used or re-used for further stopping position selection in subsequent free games. In other examples, the third random process involves using reels that correspond to columns of display positions with any configurable symbols being held in place (sometimes referred to as being a "sticky" symbol) so that it continues to be displayed irrespective of the outcome of the next spin of the reels. An individual reel arrangement compared to a non-individual reel arrangement allows for more fine grained control over the probability of different numbers of configurable symbols being collected during play of the secondary game, hence allowing for the possibility of large prizes to be awarded directly from the feature game by controlling the probability of the prize being awarded. In other embodiment, the third random process employs a weighting table which defines the possible outcomes of a selection process using random number generator 621. For example, the weighting table defines the different symbols or blank positions that can be selected and their relative probability of being selected.

In other embodiment, the same reel strips are used for both the pre-trigger phase and the free games series phase of the feature game. In another example, individual reel strips are used for both the pre-trigger phase and the feature game phase of the secondary game.

Outcome evaluator 623 monitors play of the feature game to determine whether a configurable symbol occupies a selected stopping position and is displayed at step 718. If a configurable symbol is not displayed, free game counter 812 is decremented by a predefined amount at step 720. In an embodiment, the predefined amount is one, but the counter may could be decremented by another number as is known in the art.

If there are a number of free games remaining (i.e. the value of free game counter 812 is non-zero) as determined by game controller 60 at step 722, control returns to step 716 to continue the feature game in a next iteration, for collecting potentially more held configurable symbols or prizes. On the other hand, once the number of free games is depleted, that is, when the free game counter 812 reaches zero, the series of free games ends and control returns to step 750 after any prizes are paid. In one embodiment, determining whether to pay a prize involves first determining at step 762 whether the player selected position(s) is/are each occupied by a configurable symbol. If not, at step 764, the accumulated value of all the individual prizes as indicated by the collected configurable symbol (e.g. the variable components thereof) is paid at step 728. If so, the accumulated value of all the individual prizes as indicated by the collected configurable symbols (e.g. the variable components thereof) multiplied by a multiplier (e.g. ×2 as indicated in FIG. 10) is paid at step 728. Further, there may be specific prizes awarded for defined numbers of configurable symbols being collected in addition to or instead of the displayed prizes. In an example illustrated in FIGS. 9, 10 and 11, where a maximum of 15 configurable symbols can be collected, a major progressive jackpot is awarded if 14 configurable symbols have been collected and a minor progressive jackpot prize is awarded if 13 configurable symbols have been collected.

Returning to step 718, if outcome evaluator 623 determines that at least one additional configurable symbol is displayed, then that symbol or prize value is held at step 723 for collection and the configurable symbol counter 810 is incremented at step 724. In another embodiment, each time a configurable symbol is displayed and the jackpot is not won, free game counter 812 is reset to the initial value. In both embodiments, the number of free games conducted is indefinite and is not determined by a predefined limit.

Outcome evaluator 623 then checks whether a predefined maximum number of configurable symbols have been collected/displayed at step 726. If the predefined maximum number has been reached, a feature award is paid at step 728 which comprises the accumulated value of all the individual prizes as indicated by the variable components of the collected configurable symbol multiplied by a multiplier (e.g. ×2) plus a defined jackpot prize, in the example of FIGS. 9, 10 and 11, a grand jackpot.

The predefined number of configurable symbols that may required to trigger a grand jackpot in embodiment illustrated in FIGS. 9, 10 and 11 is fifteen. That is, for this embodiment in which a game is implemented using a 5×3 matrix, configurable symbols must be displayed in all display positions. In other embodiments, the predefined number may be more than or less than fifteen. For example, in a 3-4-3-4-3 matrix configuration discussed as discussed above, the number of configurable symbols required to occupy all matrix positions would be 17. In yet other embodiments, not all of the matrix positions need necessarily be occupied, and the number of configurable symbols required for a jackpot may be determined randomly.

While in the above embodiments, the feature game ends when the grand prize 802 is triggered at step 726, in other embodiments, the feature game does not necessarily end at this point. In such embodiments, display positions are added when the configurable symbol counter 810 reaches the predefined number. For example, a game implemented using a 5×3 matrix may expand to a 3-4-3-4-3 configuration. In such embodiments, a prize in addition to the grand prize 802 is paid if configurable symbols are also displayed in those additional positions.

Alternatively, if outcome evaluator 623 determines that the predefined number of configurable symbols has not been reached at step 726, the feature game continues by returning control to step 716.

In this or other embodiments, if no configurable symbols appear on reels 814-822 in any of the free games initially awarded, free game counter 812 is reset. Such embodiments ensure the player is guaranteed to win a prize over and above the prize payable for triggering the feature game.

In the above embodiments, the jackpot paid in response to the configurable symbol counter 810 reaching the predefined threshold is grand prize 802. The grand prize in this embodiment is a linked jackpot which receives contributions from a plurality of linked gaming machines and incremented based on the turnover of the linked machines. Alternatively or additionally Major and Minor prizes may be paid by assignment of those prizes to one of the configurable symbols.

Note that in some embodiments, one or all of the grand prize 802, major prize 804, and minor prize 806 prizes may all be implemented as jackpots, as fixed bonus amounts that do not increment or as a mixture of both. In one example, grand prize 802 is implemented as a linked progressive jackpot, while major prize 804 is implemented as a standalone progressive (SAP) jackpot which only takes contributions from the gaming machine itself, incrementing the jackpot as a function of turnover. Minor prize 806 may be implemented as fixed bonus amounts in proportion to the initial bet wagered. In some embodiments, grand prize 802 may also be implemented as a SAP, or the major prize 804 may also be implemented as a link.

This embodiment implements grand prize 802 and major prize 804 as jackpots and, while both may be awarded simultaneously, neither can be awarded more than once in the same feature game. However, in other embodiments, either jackpot may be won multiple times within the same feature game. In such embodiments, players are awarded a seed value of the jackpot for subsequent triggers of that same jackpot.

As embodiments of the feature game described above automatically adjust awards based on turnover and proportionality to the initial wager, this disclosure is particularly suited to variable denomination games. Therefore, in some embodiments, game controller 60 allows player selection of the minimum bet denomination. For example, before play of the game, game controller 60 causes display controller 625 to output a message on display 54 requesting the player to select a minimum bet denomination. The player makes a selection through the game play mechanism 56 in response to which game controller 60 adjusts the amount contributed to grand prize 802 and major prize 804 and the magnitude of minor prize 806 and mini prize 808. Game controller 60 also adjusts the weightings of the values in value data 644 from which value assigner 622C may assign to the configurable symbols. In one embodiment, there are four denominations available for selection, 1c, 2c, 5c and 10c. Those skilled in the art would appreciate that the denominations are not limited to four, but can include any suitable amount in any given currency. Note also that in this embodiment, while the selected denomination affects the magnitude of the minor prize 806 and mini prize 808 fixed bonus prizes offered, it does not affect the magnitude of the grand prize 802 and major prize 804 jackpots—only the contributions funding the amount.

It will be appreciated from the above discussion that embodiments of the disclosure advantageously enable methods of gaming and gaming machines wherein a secondary game incorporating a feature game can be added to a primary game, such as an existing game, conducted in parallel without affecting the play of the underlying game by enabling the conduct of a feature game solely using the second set of display positions and thus, the feature game can be added to a number of line games while still preserving the way in which the underlying game works. Further, the secondary game has an outcome that is determined at least in part based on a number of configurable symbols displayed at the conclusion of the feature game. That is, the number of configurable symbols collected will affect either the number of prizes that are accumulated and/or whether the player wins one of the prizes that is associated with a specific number of configurable symbols.

EXAMPLE

Referring to FIGS. 9, 10 and 11, there are shown example of screen shots 900, 1000, 1100 resulting from implementation of embodiments of the disclosure.

As shown in the screen shot 900 of FIG. 9, in one example, an embodiment adds a secondary game to an underlying game which is a twenty win line game. Two groups of win line indicators 940A and 940B are shown to the left and right of the columns 814 and 822 respectively. Prize indicators for grand prize 802, major prize 804, and minor prize 806 jackpots are shown above the reels. In the example shown in FIG. 9, a credit balance 951, a total bet 952, a total win 953, a max bet 954, and three configurable symbols 961, 962 and 963 are displayed after the stopping positions occupied by these symbols have been selected for a second set of reel strips that overlay columns 814 to 822. The three displayed configurable symbols 961, 962 and 963 bear values of 10, 3, and 3 credits respectively. The configurable symbols are displayed as partially transparent so at least the existence and/or some of the features of the underlying symbols from the primary game can be perceived by the player. A stopping position unoccupied by a configurable symbol is selected for each of the remaining twelve display positions. These unoccupied positions are not displayed in FIG. 9 or are represented as transparent.

FIG. 10 shows a screen shot 1000 after a feature game has been triggered. In this example, there are 6 configurable symbols 1061, 1062, 1063, 1064, 1065, and 1066 displayed which triggers the feature game, with a stopping position unoccupied by a configurable symbol being selected for each of the remaining 9 display positions. These 6 configurable symbols are displayed as partially transparent and the remaining 9 display positions are each represented as translucent to indicate an unoccupied stopping position. There is a total of the number of configurable symbols collected added to the display area as well as a number of free spins remaining in the free game counter 812. The player has selected display positions 1051, 1052, 1053 to be the three player-selected display positions that have the potential to invoke a ×2 multiplier. It will be apparent from viewing, for example, symbol display position 1071 that the underlying symbol, here a King symbol, can be viewed.

Referring to FIG. 11, there is shown an example screen shot 700 of the conclusion of the feature game. Twelve display positions are occupied such that the player has not obtained sufficient configurable symbols to win either the grand, major or minor jackpot. However, configurable symbols have occupied each of display positions 1051, 1052, 1053 which were selected by the player. Accordingly, a ×2 multiplier has been applied to the face value of 14 credits shown on the configurable symbols to result in a win of 28 credits as indicated by item 1110.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further, different parts of the program code can be executed by different devices, for example in a client server relationship. Persons skilled in the art, will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the embodiments of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A gaming system comprising:

a client device having a display; and a server coupled to the client device, the server comprising at least one processor and at least one memory storing a plurality of instructions which, when executed, cause the at least one processor to at least:

transmit data to the client device indicative of a first plurality of symbols selected for display at the client device from a symbol set based on one or more random numbers generated by a random number generator, when the first plurality of symbols selected include a plurality of configurable symbols, receive one or more player selections selected from among a plurality of non-configurable symbols displayed from the client device, transmit data to the client device indicative of a plurality of multiplier indicia for display at the one or more player selections, transmit data to the client device indicative of a second plurality of symbols for display at the client device unoccupied by the plurality of configurable symbols based on the random number while retaining the plurality of configurable symbols, and transmit data to the client device indicative of an award for display accumulated from a plurality of values assigned to the plurality of configurable symbols displayed on the client device and the plurality of configurable symbols displayed with the multiplier indicia thereon.

2. The gaming system of claim 1, wherein the instructions, when executed, further cause the at least one processor to transmit data to the client device for retaining the plurality of configurable symbols while displaying the second plurality of symbols at the client device unoccupied by the plurality of configurable symbols.

3. The gaming system of claim 1, wherein the instructions, when executed, further cause the at least one processor to transmit data to the client device for receiving at least two player selections from the second plurality of symbols that include the plurality of configurable symbols.

4. The gaming system of claim 1, wherein the instructions, when executed, further cause the at least one processor to transmit data to the client device indicative of the multiplier indicia selected from a plurality of predefined multipliers.

5. The gaming system of claim 1, wherein the instructions, when executed, further cause the at least one processor to predetermine the plurality of configurable symbols to be displayed on the client device.

6. The gaming system of claim 1, wherein the instructions, when executed, further cause the at least one processor to determine the award based on the multiplier indicia applied to the plurality of values assigned to the plurality of configurable symbols displayed on the client device, when all of the second plurality of symbols are occupied by the configurable symbols.

7. A method of conducting a game on an electronic gaming system having a server coupled to a client device displaying a plurality of display positions, the server comprising at least one processor and at least one memory, the method comprising:

controlling the client device to animate the plurality of display positions being populated with a first plurality of symbols selected from a symbol set, based on a random number generated by a random number generator, wherein the symbol set includes a plurality of configurable symbols and non-configurable symbols;

when the plurality of display positions include one or more configurable symbols, transmitting one or more player selections selected from among the display positions displaying one or more non-configurable symbols from the client device to the server;

controlling the client device to animate one or more display positions associated with the one or more player selections being populated with multiplier indicia;

controlling the client device to animate the plurality of display positions displaying the one or more non-configurable symbols being replaced with a second plurality of symbols based on the random number while retaining in the plurality of display positions displaying the one or more configurable symbols; and controlling the client device to animate an outcome being accumulated from a plurality of values assigned to the configurable symbols from the first plurality of symbols and the second plurality of symbols, and the multiplier indicia.

8. The method of claim 7, further comprising animating the plurality of configurable symbols being retained from the first plurality of symbols while displaying the second plurality of symbols.

9. The method of claim 7, further comprising receiving at least two player selections among the display positions occupied by the one or more non-configurable symbols from the client device.

10. The method of claim 7, further comprising at least one of controlling the client device to animate the plurality of display positions being populated with the first plurality of symbols, controlling the client device to animate the plurality of display positions displaying the one or more player selections, controlling the client device to animate the plurality of display positions displaying the one or more non-configurable symbols being replaced, and controlling the client device to animate the outcome is initiated when one or more messages are transmitted to the client device.

11. The method of claim 7, further comprising determining if a predetermined number of the configurable symbols occupies the display positions.

12. The method of claim 7, further comprising determining the outcome based on the multiplier indicia applied to the values assigned to the configurable symbols from the first plurality of symbols and the second plurality of symbols, when all of the second plurality of symbols are occupied by the configurable symbols.

13. The method of claim 12, wherein the symbol set is a first symbol set, further comprising selecting the second plurality of symbols from one of the first symbol set and a different second symbol set.

14. A non-transitory computer-readable medium comprising a plurality of instructions for operating a gaming system that includes a server comprising at least one processor, wherein the plurality of instructions, when executed, cause the at least one processor to at least perform the steps of:

causing a plurality of display positions displayed on a client device to be populated with a first set of symbols selected randomly based on a random number generated by a random number generator;

in response to a predetermined number of display positions being occupied by a plurality of configurable symbols, receiving from the client device a set of player selections from among a plurality of non-configurable symbols displayed;

causing the display positions occupied by the non-configurable symbols to be populated with a second set of symbols selected randomly based on the random number;

in response to the second set of symbols selected including one or more of the configurable symbols, causing the plurality of display positions associated with the set of player selections to animate a plurality of multiplier indicia; and causing the client device to visually animate an award accumulated from a plurality of values assigned to the plurality of configurable symbols displayed and the plurality of multiplier indicia.

15. The non-transitory computer-readable medium of claim 14, wherein the instructions, when executed, cause the at least one processor to perform the step of retaining the configurable symbols while displaying the second set of symbols.

16. The non-transitory computer-readable medium of claim 14, wherein the instructions, when executed, cause the at least one processor to perform the step of receiving at least two player selections.

17. The non-transitory computer-readable medium of claim 14, wherein the instructions, when executed, cause the at least one processor to perform the step of selecting the plurality of multiplier indicia from a plurality of predefined multipliers.

18. The non-transitory computer-readable medium of claim 14, wherein the instructions, when executed, cause the at least one processor to perform at least one of the steps of causing the plurality of display positions displayed on the client device to be populated with the first set of symbols, causing the display positions occupied by the non-configurable symbols to be populated with the second set of symbols, and causing the client device to visually animate the award, when one or more messages are transmitted to the client device.

19. The non-transitory computer-readable medium of claim 18, wherein the instructions, when executed, cause the at least one processor to perform the steps of selecting the first set of symbols from a first symbol set, and selecting the second set of symbols from one of the first symbol set and a different second symbol set.

20. The non-transitory computer-readable medium of claim 14, wherein the instructions, when executed, cause the at least one processor to perform the step of determining the award based on the plurality of multiplier indicia applied to the plurality of values assigned to the plurality of configurable symbols displayed, when all of the second set of symbols includes the configurable symbols.

* * * * *